US012711273B2

(12) United States Patent
Cutillo

(10) Patent No.: US 12,711,273 B2
(45) Date of Patent: Aug. 18, 2026

(54) PSEUDONYMISATION METHOD AND COMPUTER SYSTEM FOR PERFORMING THE METHOD

(71) Applicant: THE EUROPEAN UNION, REPRESENTED BY THE EUROPEAN COMMISSION, Brussels (BE)

(72) Inventor: Leucio Antonio Cutillo, Turin (IT)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 47 days.

(21) Appl. No.: 18/841,653

(22) PCT Filed: Feb. 28, 2023

(86) PCT No.: PCT/EP2023/054901
§ 371 (c)(1),
(2) Date: Aug. 26, 2024

(87) PCT Pub. No.: WO2023/161500
PCT Pub. Date: Aug. 31, 2023

(65) Prior Publication Data

US 2025/0173460 A1 May 29, 2025

(30) Foreign Application Priority Data

Feb. 28, 2022 (EP) .................................... 22159162

(51) Int. Cl.
*G06F 21/00* (2013.01)
*G06F 21/62* (2013.01)
*H04L 9/06* (2006.01)
*H04L 9/08* (2006.01)

(52) U.S. Cl.
CPC ........ *G06F 21/6254* (2013.01); *H04L 9/0643* (2013.01); *H04L 9/0869* (2013.01)

(58) Field of Classification Search
None
See application file for complete search history.

(56) References Cited

U.S. PATENT DOCUMENTS

2010/0185861 A1* 7/2010 Chase ..................... H04L 9/083 713/171
2011/0202767 A1* 8/2011 Hui ......................... H04L 9/321 713/168
2012/0072723 A1 3/2012 Orsini et al.
2019/0245705 A1 8/2019 Kumar et al.

OTHER PUBLICATIONS

International Search Report and Written Opinion for PCT Application No. PCT/EP2023/054901, dated Apr. 26, 2023, 8 pages.

* cited by examiner

*Primary Examiner* — Andrew J Steinle
(74) *Attorney, Agent, or Firm* — Dickinson Wright PLLC

(57) ABSTRACT

A pseudonymisation method is disclosed. The pseudonymisation method comprises receiving a data subject identifier from a first data controller, the first data controller having a first data controller identifier, computing a pseudonym seed based on the data subject identifier using a cryptographic mixing function based on a pseudonym seed generation key, and computing a global pseudonym as a first hash-based message authentication code on the pseudonym seed with a global pseudonym key.

24 Claims, 3 Drawing Sheets

PSEUDONYMISATION METHOD AND COMPUTER SYSTEM FOR PERFORMING THE METHOD

CROSS-REFERENCE TO RELATED APPLICATION(S)

This present application is a national stage application of International Patent Application No. PCT/EP2023/054901, filed Feb. 28, 2023, which claims priority to European Patent Application No. 22159162.1, filed Feb. 28, 2022, the disclosures of which are hereby incorporated by reference in their entireties.

TECHNICAL FIELD

The present disclosure relates to a pseudonymisation method. The disclosure further relates to a computer system for performing the method.

BACKGROUND

According to the EU General Data Protection Regulation 2016/679 (colloquially known as "GDPR"), 'pseudonymisation' means the processing of personal data in such a manner that the personal data can no longer be attributed to a specific data subject without the use of additional information, provided that such additional information is kept separately and is subject to technical and organisational measures to ensure that the personal data are not attributed to an identified or identifiable natural person. A series of state-of-the-art pseudonymisation techniques have for example already been described by the European Union Agency for Cybersecurity.

The techniques described focus mainly on the case where a single data controller wants to pseudonymise the personal data of its data subjects. Such techniques do not solve the problem of privacy-preserving pseudonymised data linkage when for example several data controllers want to share data about their mutual data subjects. Several of the solutions discussed only describe for example how to pseudonymise and transmit security-critical records in a public network, without the possibility of linking such data to further data controllers while respecting the privacy of their data subjects.

In order to be able to perform data linkage across different sources, such as for example data controllers, the pseudonyms associated with the same person by different data controllers should match. This can however severely threaten the rights and freedoms of the data subject, as in such case a unique pseudonym would be associated with the same person. In case a data breach is experienced by a single data controller, the involved data subjects could be re-identified in several further datasets presenting the same pseudonym.

Therefore, pseudonyms should be computed in such a way that different data controllers use distinct pseudonyms for the same data subject. In this scenario however, a third party is needed to compute and distribute pseudonyms to the data controllers. Such third party would be able to keep the link between different pseudonyms referring to the same data subject and provide the personal data linkage service.

When this third party is however implemented as a central entity, a problem can arise: such party (or an attacker taking control of it) can derive information on data subjects' identities both from the data it receives as an input to compute pseudonyms, from the graph linking the different pseudonyms related to the same subject, and finally from the characteristics of the data controller requesting a pseudonym.

Solutions that adopt this approach therefore suffer from an increased risk of data subject re-identification.

SUMMARY

It is an object of the present disclosure to provide an improved pseudonymisation method which allows different data controllers to use different local pseudonyms while decreasing the risk of data subject re-identification even when sharing data on data subjects with each other.

This object is achieved according to the disclosure with the first claim showing the technical characteristics of the first independent claim.

Thereto, a pseudonymisation method is provided, wherein the method comprises:

- receiving a data subject identifier from a first data controller, the first data controller having a first data controller identifier,
- computing a pseudonym seed based on the data subject identifier using a cryptographic mixing function based on a pseudonym seed generation key, and
- computing a global pseudonym as a first hash-based message authentication code on the pseudonym seed with a global pseudonym key.

It has been found that in such method, different data controllers can use different local pseudonyms, for example based on the global pseudonym, whereas the computed global pseudonym will remain the same for a single data subject identifier. In other words, the different pseudonyms referring to a single data subject can still be linked to the global pseudonym allowing for example an exchange of information if desired.

It has further been found that the global pseudonym does not need to be kept in a central repository as it can be computed and/or recomputed when needed, reducing the risk for re-identification of the data subjects and making, in fact, a central repository more obsolete.

According to embodiments of the present disclosure, the method comprises further

- computing a local pseudonym key as a second hash-based message authentication code on the pseudonym seed combined with the first data controller identifier with a local pseudonym key generation key,
- computing a local pseudonym based on the global pseudonym using a cryptographic mixing function based on the local pseudonym key, and
- providing the local pseudonym to the first data controller.

Such computed local pseudonyms can be used by different data controllers as a local pseudonym without having to provide full data subject identifiers to a central authority.

According to embodiments of the present disclosure, steps b-f are performed by a second entity separate from the data controller. Such configuration allows further reducing the risk for re-identification of the data subjects as the global pseudonym can now remain unknown to the first data controller. Further, data subject identifiers of the data subjects preferably remain unknown to the second entity. The second entity can thus not list the identity of all data subjects for which pseudonyms have been requested, either by the first data controller or further second data controllers. Further, the second entity can also not be certain on whether a data subject has received a pseudonym or not. The second entity by keeping the global pseudonym key and the local pseudonym key generation key secret can further reduce the risk of data subject re-identification.

According to embodiments of the present disclosure, the pseudonym seed computation comprises:

b1. computing an encrypted data subject identifier based on the data subject identifier using the cryptographic mixing function based on a random key, preferably even a random one-time key;

b2. computing the pseudonym seed based on the encrypted data subject identifier using the cryptographic mixing function based on a pseudonym seed key, the pseudonym seed key being computed based on the pseudonym seed generation key as a cryptographic mixing function based on the random key and wherein the first and/or the second hash-based message authentication codes are computed on the cryptographic mixing function of the encrypted data subject identifier based on the pseudonym seed key.

Preferably, generation of the random key and the pseudonym seed key is done by a third entity separate from the data controller, also called first entity, and the second entity. Such configuration allows to further decrease the risk of data subject re-identification as the encrypted data subject identifier is now determined by a random key, preferably by the data controller itself. Further, usage of the third entity ensures usage of the random key instead of using a self-determined perhaps less random key. The third entity by keeping the pseudonym seed generation key secret, further ensures security of the method. More preferably, step b1 is performed by the data controller, while step b2 is performed by the second entity separated from the data controller. Such configuration prevents the second entity from deriving information on the data subject identifier as this entity computes the pseudonym seed from an identifier that is now encrypted, and that it cannot decrypt.

According to embodiments of the present disclosure, the different keys, the global pseudonym, the local pseudonym and the data controller identifier are bit sequences of a predetermined length and the cryptographic mixing function is the exclusive or function. It has been found that such bit sequences allow relative easy computations.

According to embodiments of the present disclosure, shared pseudonyms between the first data controller and a separate second data controller are computed as a third hash-based message authentication code on the global pseudonym combined with the cryptographic mixing function of the first data controller identifier and the second data controller identifier with a shared pseudonym key. Such configuration has been found to allow computation of different shared pseudonyms for different data subjects depending on the data controllers involved.

According to embodiments, for computing the third hash-based message authentication code the first data controller identifier and the second data controller identifier are encrypted.

To further increase security, the third hash-based message authentication code is computed by a fourth entity separate from the first data controller and second and third entity. The fourth entity by keeping the shared pseudonym key secret, further ensures security of the method.

More preferably, the encryption of the first data controller identifier and the second data controller identifier is done by a fifth entity separate from the first data controller and second, third and fourth entity.

According to embodiments of the present disclosure, communication of data between respective entities is signed and encrypted using asymmetric cryptography. Such communication allows the different parties to become more certain on the sending party's identity and to avoid undesired parties to read or modify the communication between the different entities, especially when the communication network between the different entities is public, such as for example a computer network, for example the Internet.

According to embodiments of the present disclosure, the third hash-based message authentication code is computed according to a policy defined by the first data controller. Such policy allows the first data controller to define rules for sharing data with other data controllers.

It is in general noted that the different steps of the different embodiments of the method according to the disclosure can often be distributed and computed parallel with respect to each other such offering possibilities to improve scaling of the method when for example a lot of such steps need to be performed, for example when there is a large amount of data subjects, data controllers, etc.

It is (another) object of the present disclosure to provide a computer system for performing the method according to the disclosure.

This object is achieved according to the disclosure with a computer system of the second independent claim.

Thereto, the computer system comprises at least one computer programmed for performing the method according to the disclosure.

According to embodiments of the present disclosure, the separate entities comprise separate computers programmed for performing the methods respectively performed at the separate entities, the separate computers being interconnected by a computer network.

BRIEF DESCRIPTION OF THE DRAWINGS

The disclosure will be further explained by means of the following description and the appended figures.

DETAILED DESCRIPTION

Figure 1:
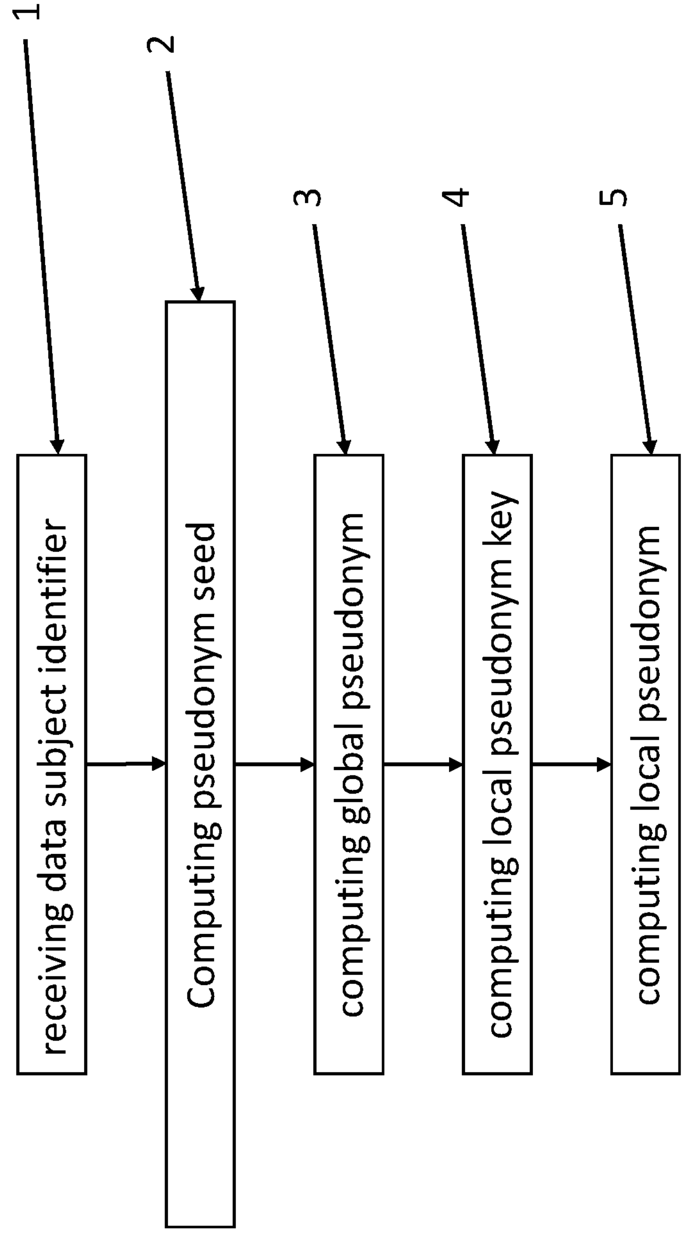
FIGS. 1-3 show a schematic overview of embodiments of the present disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments are to be construed as exemplary manners in which the disclosure may be implemented rather than as limiting the scope of the disclosure.

The disclosure relates to a pseudonymisation method for a pseudonymisation of a data subject. The data subject for example can be an identifiable object where the property of no longer being identified directly or indirectly without the use of additional information is desired such as for example an object with an identification number such as for example a machine such as for example a vehicle. Preferably however, the data subject is a person, preferably a natural person. The data subject has data related to it. The data according to this disclosure preferably is sensitive and subject to privacy regulations, such as for example the GDPR regulations earlier mentioned. Such data can for example be a name, an identification number, location data, an online identifier, factors specific to the physical, physiological, genetic, mental, economic, cultural or social identity, in particular data revealing racial or ethnic origin, political opinions, religious or philosophical beliefs, trade union membership, genetic data, biometric data, data concerning health or data concerning a natural person's sex life or sexual orientation. For protecting the privacy of the data subject it is desired to pseudonymise this data.

The data in this disclosure is processed by a data controller which determines the purposes and means of the processing. For example, the data controller has collected sensitive data from a data subject and has digitally stored that data for later use, such as for example research. The data controller can for example be a research institution, such as for example a school, such as for example a university, a healthcare provider, such as for example a hospital, a physician, etc., or other organisation such as for example an insurance company, a government agency, etc. or even a combination of these categories.

For any of such data controllers to create a pseudonym for a data subject, the method according to the disclosure comprises in a first step receiving 1 a data subject identifier from a first data controller.

The data subject identifier is a, preferably unique, identifier for the data subject. For example, the data subject identifier is based on a collection, for example a concatenation, of identification data related to the data subject. For example, the data subject identifier is based on a concatenation of names of the data subject, for example first name or names and/or the surname of the data subject, at least part of the date of birth, preferably the full date of birth, place of birth, identity details of the data subject's siblings, etc., preferably in a predetermined order.

For example, in a concrete example, the data subject identifier is based on a concatenation of names of the data subject and/or a date related to the data subject, such as for example the date of birth. Preferably, the information used in the data subject identifier is in a predetermined format. According to an embodiment, for example the first name of the data subject, noted as firstName, the surname of the data subject, noted as secondName, and the date of birth, noted as dateOfBirth, in a predetermined format, for example two digits for the day, followed by two digits for the month and four digits for the year also known as "ddmmaaaa" although other formats such as for example "mmddaaaa" or "aaaammdd" or "aaaaddmm" are also possible. This data subject identifier is for example called Personal Identifier (PID). This can be symbolically noted as: PID=firstName||secondName||dateOfBirth wherein "||" is used as the symbol representing concatenation. Further, the collection of identification data preferably is hashed in a hashed data subject identifier HID. For example, the PID is hashed to HID of a predetermined bit length, such as for example 512 bits. Preferably, a relative slow and relative difficult to calculate Key Derivation Function should be chosen, preferably repeatedly executing a cryptographic hash function in a loop. For example a Password Based Key Derivation Function, for example PBKDF2( ) is used of PID and a salt value. The salt value for example is a, preferably cryptographic, hash value of PID, such as for example a Secure Hash Algorithm such as for example Secure Hash Algorithm 2, for example SHA512(PID). The PBKDF2( ) function for example uses SHA512 as pseudorandom function and a number of iterations numIterations for example as high as 4500. This can for example be noted as HID=PBKDF2(PID, SHA512(PID),numIterations,512b). By using HID, the identity of the data subject can be hidden during further steps of the method according to the disclosure.

As part of the method, a cryptographic mixing function can be used. For example, the cryptographic mixing function can be the boolean exclusive OR function (noted as XOR( )). In such function, two values of the same bit length can be combined into a new value of the same bit length as the original values, the computed value being the exclusive OR of the two original values. It should be noted that the XOR( ) function is commutative and associative. Further, inherent to the XOR( ) function, if C=XOR(A,B) then B=XOR(C,A) and A=XOR(B,C). The cryptographic mixing function can be used based on a generated, for example random, key, for example K. For example, K is a value having the same bit length as HID. In such embodiment the data subject identifier is then further encrypted by computing the exclusive OR of for example HID with K noted as XOR(HID,K).

According to an embodiment of the present disclosure, in a next step a pseudonym seed (PS) is computed 2. The pseudonym seed is preferably based on the hashed data subject identifier HID using a cryptographic mixing function based on a pseudonym seed generation key, called $K_{PSG}$. For example, the cryptographic mixing function can be the Boolean exclusive OR function (noted as XOR( )) with $K_{PSG}$ being a value having the same bit length as the hashed data subject identifier, for example HID. In such embodiment the hashed data subject identifier is then further encrypted by computing the exclusive OR of for example HID with $K_{PSG}$ noted as XOR(HID,$K_{PSG}$).

In a next step a global pseudonym (GP) is computed 3 as a first hash-based message authentication code, on the pseudonym seed PS with a global pseudonym key, noted as $K_{GP}$.

Preferably, the first hash-based message authentication code is for example computed using a HMAC( ) function, for example a keyed cryptographic hash function, for example a SHA512 keyed cryptographic hash function, on PS using as key the $K_{GP}$. This is for example noted as GP=H(PS,$K_{GP}$) or when for example using SHA512 GP=HMAC(SHA512,PS,$K_{GP}$).

According to embodiments, the PS is preferably calculated by a separate entity separate from the first data controller, with $K_{PSG}$ unknown to the first data controller. This entity preferably is then for example called the pseudonym generation provider or PGP.

To further decrease the risk of data subject re-identification during the disclosure, the pseudonym seed can for example be computed in two steps from the first data controller and the PGP respectively.

In the first step, the hashed data subject identifier can be subjected by the first data controller to a further cryptographic mixing function based on a generated, for example random, key, for example $K_{ROT}$. For example, the cryptographic mixing function can be the Boolean exclusive OR function (noted as XOR( )) with $K_{ROT}$ being a value having the same bit length as HID. In such embodiment the hashed data subject identifier is then further encrypted by computing the exclusive OR of for example HID with $K_{ROT}$ noted as XOR(HID,$K_{ROT}$). The resulting encrypted data subject identifier can then for example be noted as EID. The value of $K_{ROT}$ can for example change several times, for example each time an EID is computed and thus $K_{ROT}$ is a so-called one time key. According to embodiments the $K_{ROT}$ is provided by an entity separate from the first data controller.

Preferably, the pseudonym seed generation key is kept by an entity separate from the first data controller and, more preferably and if applicable, also separate from the pseudonym generation provider, called for example encryption key provider or EKP. The encryption key provider in such embodiment preferably keeps the pseudonym seed generation key secret from further entities such as for example the first data controller and the PGP if applicable. According to such embodiments, the EKP first issues a random one time key $K_{ROT}$ as described above to the first data controller and the first data controller proceeds with computing the EID. Further, the EKP computes a pseudonym seed key, called $K_{PS}$, using the cryptographic mixing function based on the $K_{PSG}$ and the $K_{ROT}$. For example, the cryptographic mixing function can be the Boolean exclusive OR function (noted as XOR( )). In such embodiment the $K_{PSG}$ is then further encrypted as the $K_{PS}$ by computing the $K_{PS}$ as the exclusive OR of the $K_{PSG}$ with the $K_{ROT}$ noted as $K_{PS}$=XOR($K_{ROT}$, $K_{PSG}$). It should be noted that the XOR( ) function is commutative and associative and, inherent to the XOR( ) function, $K_{PSG}$=XOR($K_{PS}$,$K_{ROT}$) and $K_{ROT}$=XOR($K_{PSG}$, $K_{PS}$). According to such embodiments, the $K_{PS}$ is not shared with the first data controller but however is shared with the PGP.

In the second step, according to such embodiments, the encrypted data subject identifier is then further encrypted by the PGP by computing the exclusive OR of EID with $K_{PS}$ noted as XOR(EID,$K_{PS}$) which corresponds to XOR(XOR (HID,$K_{ROT}$),$K_{PS}$)=XOR(HID,XOR($K_{ROT}$,$K_{PS}$))=XOR (HID,$K_{PSG}$)=PS. In such embodiment, the PGP is unaware of the $K_{ROT}$ and thus cannot compute HID from EID received by the first data controller. In such embodiment, the PGP is also unaware of $K_{PSG}$ and cannot compute HID from PS.

In such embodiments, the pseudonym seed PS is thus computed based on the encrypted data subject identifier EID using the cryptographic mixing function based on the pseudonym seed key. The pseudonym seed key is in its turn computed based on the pseudonym seed generation key as a cryptographic mixing function based on the random key. The first hash-based message authentication code is thus computed on the cryptographic mixing function of the encrypted data subject identifier based on the pseudonym seed key.

According to embodiments, the GP after computation can for example be saved at a GP database called GPD. Preferably, the GPD is separate from the first data controller, such that the GP is not known to the first data controller which is especially desired if the first data controller wants to share its data with further, for example a second, data controller.

To identify a data controller such as the first data controller, similarly, the data controller has an identifier, called the data controller identifier CID. The first data controller in the current example is then for example referred to as $CID_1$, a second data controller is then for example referred to as $CID_2$, etc. The data controller identifier for example is a value, for example a random value, preferably unambiguously identifying the data controller when using the method. Preferably, the data controller identifier is a value of a predetermined bit length, for example a 255 bit value for example encoded in base 64 format.

According to embodiments of the method, following further steps are performed:

computing 4 a local pseudonym key as a second hash-based message authentication code on the pseudonym seed combined with the first data controller identifier with a local pseudonym key generation key, computing 5 a local pseudonym based on the global pseudonym using a cryptographic mixing function based on the local pseudonym key, and providing 6 the local pseudonym to the first data controller.

This method is for example shown in FIG. 1.

The local pseudonym key is for example called $K_{LP}$ and the local pseudonym key generation key for example is called $K_{LPKG}$. The second hash-based message authentication code is for example also computed using a HMAC( ) function, for example a keyed cryptographic hash function, for example a SHA512 keyed cryptographic hash function, on PS combined with the $CID_1$ using as key the $K_{LPKG}$. This is for example noted as $K_{LP}$=H(PS||$CID_1$,$K_{LPKG}$) or when for example using SHA512 $K_{LP}$=HMAC(SHA512, PS||$CID_1$,$K_{LPKG}$). Again, "||" is used as the symbol representing concatenation. It is reminded that PS can for example be based on HID or EID as explained above.

Should first data controller require, for example for reasons of a local security breach or to periodically reset the local pseudonyms generated to further increase security, new local pseudonyms, the $K_{LP}$ can be computed as $K_{LP}$=HMAC(SHA512,PS||$CID_1$|| epoch,$K_{LPKG}$), with epoch representing a counter, for example starting at 0, increasing each time such new local pseudonyms are required. Such epoch avoids having to, for example, generate new keys and having to regenerate the GP, thus also affecting other agents in the method, such as for example the PGP and/or the EKP.

The local pseudonym is for example called LP. For example, the cryptographic mixing function can be the Boolean exclusive OR function (noted as XOR( )). In such embodiment the GP is then further encrypted as the LP by computing the LP as the exclusive OR of the GP with the $K_{LP}$ noted as LP=XOR(GP,$K_{LP}$).

It is noted that preferably steps b, more preferably b2, and c and d and e and f are performed by the PGP, as well as the computation of the LP, if applicable and that the PGP is a different entity from the first data controller. Further, the PGP keeps its keys, if applicable the $K_{GP}$ and the $K_{LPKG}$, secret and/or that the first data controller keeps the identity of the data subject secret, for example the data subject identity itself, HID, EID, etc. Further, if the EKP is involved, the EKP preferably keeps the $K_{PSG}$ secret. This way, important information is kept separate and the different entities cannot easily link information in the event that any one of them should be compromised, thus decreasing the risk of data subject re-identification.

If the first data controller desires to publish on LP, the first data controller could compute different further values based on LP. For example, by choosing for each LP a random value that is kept secret and by adding or subtracting a multiple of that value from LP and using the result for the publication. To further increase security, for each different publication, $CID_1$ can use a different multiple of the chosen secret random value for the LP.

Figure 2:
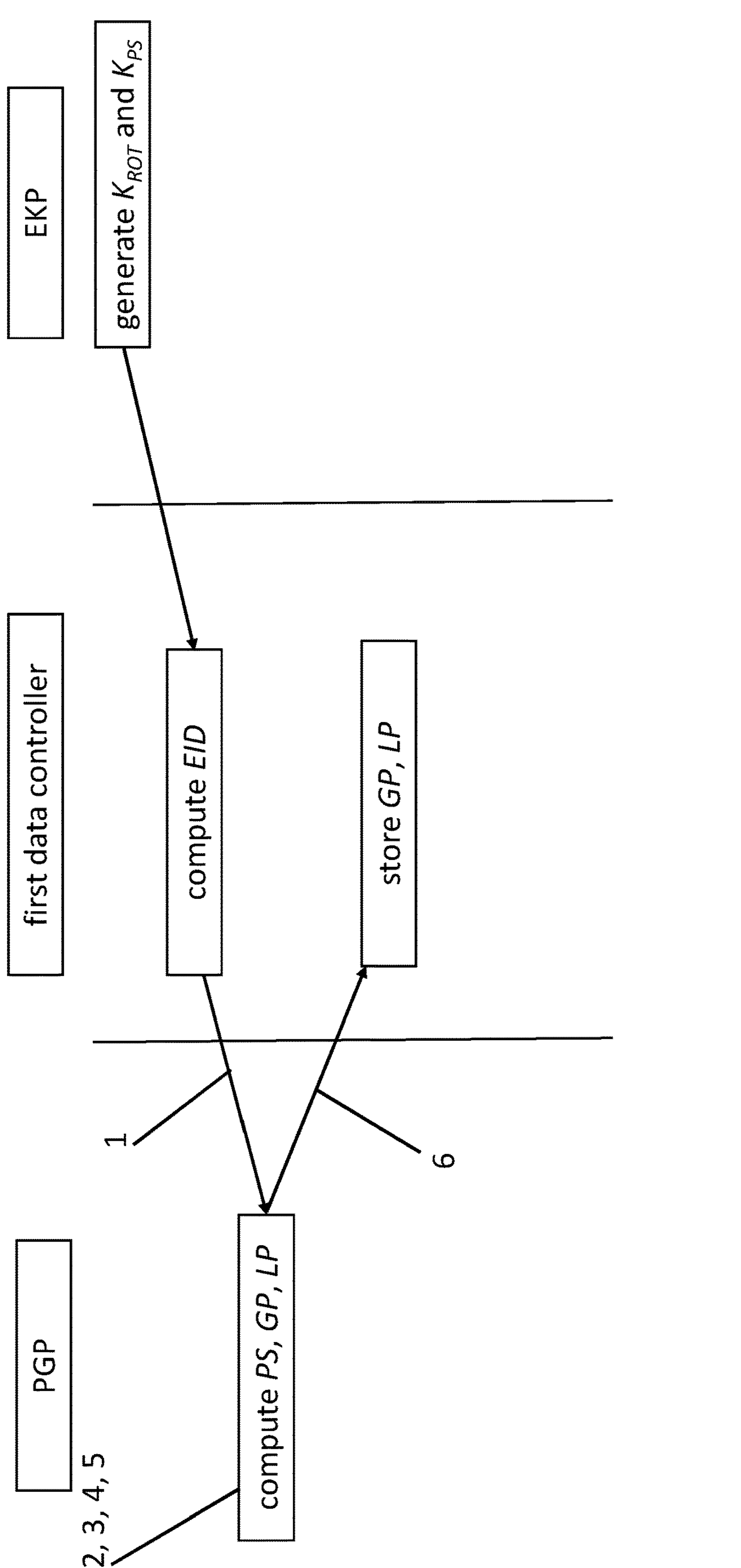

FIG. 2 shows a schematic overview of the flow of data between these different entities.

When the first data controller wants to share data with another data controller, the GP can be uploaded to the GPD. This can be done by the PGP or by the first data controller. In case the first data controller is responsible for uploading the GP to the GPD, the GP preferably is encrypted by the PGP for the GPD such that the first data controller is prevented from knowing the GP.

When the, preferably encrypted, GP is uploaded to the GPD, a sharing policy for sharing data of the data subject with other data controller can be included. This way the GPD will gather the GP of different data subjects, with the different sharing policies of the different data controllers involved.

When two data controllers, referred to with the data controller identifiers $CID_1$ and $CID_2$ as discussed earlier, want to share data on a data subject, preferably, a shared pseudonym, noted $SP_{12}$, is computed 7. Preferably, the shared pseudonym is computed by the GPD as the GPD preferably is in possession of the different sharing policies together with the GP of the different data subjects involved. Preferably, the sharing policies are also kept secret by the GPD, especially for the different data controllers. The shared pseudonym is preferably computed as a third hash-based message authentication code on the global pseudonym GP combined with the cryptographic mixing function of the first data controller identifier $CID_1$ and the second data controller identifier $CID_2$ with a shared pseudonym key, called in its turn $K_{SP}$. The third hash-based message authentication code is for example also computed using a HMAC( ) function, for example a keyed cryptographic hash function, for example a SHA512 keyed cryptographic hash function, on GP combined with the cryptographic mixing function of the first data controller identifier $CID_1$ and the second data controller identifier $CID_2$ using as key the $K_{SP}$. This is for example noted as $SP_{12}$=HMAC(GP||XOR($CID_1$,$CID_2$),$K_{SP}$) or when for example using SHA512 $SP_{12}$=HMAC(SHA512, GP||XOR($CID_1$,$CID_2$),$K_{SP}$). Again, "||" is used as the symbol representing concatenation.

Upon receipt of the different $SP_{12}$, the $CID_1$ can start sharing data with $CID_2$ on the pseudonymised data subjects by using $SP_{12}$ for the data subjects.

Since the GPD is in possession of the different computed GP connected to the different data controller identifiers and their respective sharing policies, the GPD could connect a GP to different data controllers and derive from that knowledge privacy sensitive knowledge for a certain GP, for example at which medical facilities a data subject sought treatment. To further enhance the security and/or decrease the risk of data subject re-identification of the method, therefore a further step can be provided in between the data controller and the GPD in which the respective CID values are encrypted 8. Further preferably, this encryption is being done by a further separate entity, a fifth entity called pseudonym lookup provider or PLP.

Figure 3:
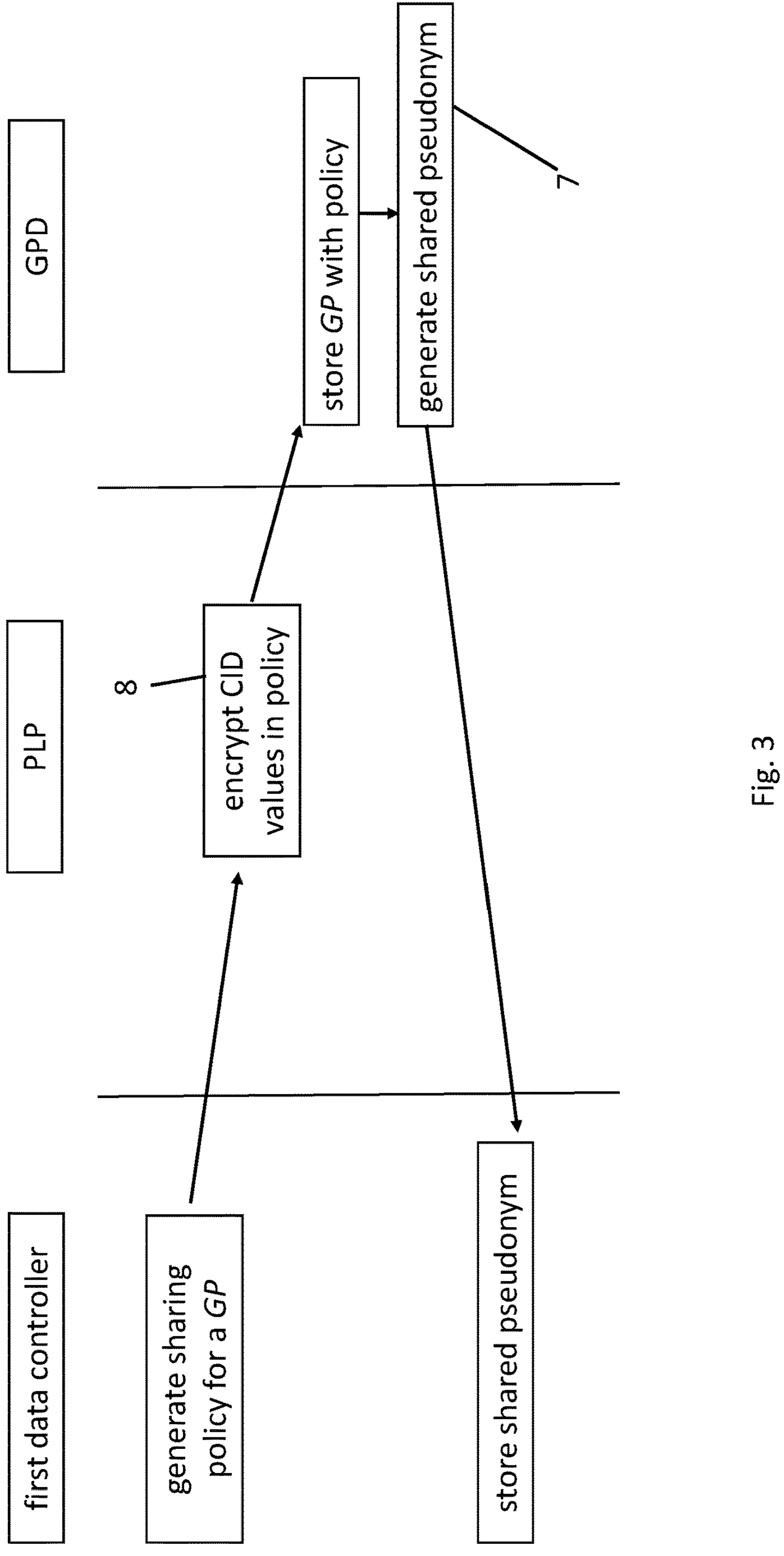

This embodiment is for example shown in FIG. 3.

According to such embodiments, the first data controller $CID_1$ can request the GPD, if applicable through the PLP, if applicable in accordance with the applicable sharing policies, for a list of further data controllers where a data subject of $CID_1$ is also registered, possibly together with the corresponding applicable shared pseudonyms to be used between the first data controller and each of the other data controllers. Based on the retrieved shared pseudonyms, the first data controller can then proceed with, in according with the applicable sharing policies, share information with the other data controllers. However, if two data controllers were already sharing data based on the local pseudonym of the data subject at one of the data controllers directly, they can continue to do so, in accordance with the defined sharing policies.

In further embodiments, a third party, a data controller for example a research organisation, can receive data on data subjects from different data controllers, for example a further first and second data controller. To share data with the third party, the two data controllers for example publish their respective LP, for example as described above. However, solely based on the LP of the two data controllers the third party cannot derive from the different LPs whether or not they concern the same data subjects. Hence, the data controller can for example not link the data between two data subjects, for example to better study the data of a data subject shared between the two data controllers. In order to be able to make the link between different LPs from different data controllers, when sharing their LPs with the third party, the data controllers can also share the global pseudonym of the LPs which they for example received upon creation of the LPs, preferably in encrypted form. If the third party then wants to link LPs from different data controllers, the third party can provide the GPs, albeit preferably encrypted for the GPD, from the respective data controllers to the GPD, if applicable through the PLP. The GPD can then, as described above, compute the shared pseudonyms for the global pseudonyms for the two data controllers, if applicable, according to the defined sharing policies. For that purpose, the sharing policies can comprise specific sharing policies for this case of linking different LPs. If there are matching shared pseudonyms for global pseudonyms, this means that the corresponding two local pseudonyms in fact refer to the same data subject and, if applicable, the sharing policies allow that the data is shared. Hence, this information can be shared with the third party, enabling the third party to link the appropriate LPs. For example, the GPD, if applicable through the PLP, can share with the third party a mapping indicating which globalpseudonyms, preferably encrypted global pseudonyms, are linked, for example by sharing the shared pseudonyms for the submitted global pseudonyms, preferably encrypted global pseudonyms, without having to reveal further identification data on the globalpseudonyms. The third party in such situation can for example set up an identifier, for example called mesh identifier, to link together all the local pseudonyms referring to the same data subject, which in fact will have the same shared pseudonyms.

Preferably, the different entities CID, PGP, EKP, PLP and GPD are different entities separate from each other, each keeping their keys secret from each other. Preferably, the communication of data between respective entities is signed and encrypted using asymmetric cryptography, especially when the communication is over a public network such as for example an intranet or the Internet.

Although aspects of the present disclosure have been described with respect to specific embodiments, it will be readily appreciated that these aspects may be implemented in other forms.

What is claimed is:

1. A pseudonymisation method, wherein the pseudonymisation method comprises:

receiving a data subject identifier from a first data controller, the first data controller having a first data controller identifier, computing a pseudonym seed based on the data subject identifier using a cryptographic mixing function based on a pseudonym seed generation key, and computing a global pseudonym as a first hash-based message authentication code on the pseudonym seed with a global pseudonym key;

the method further comprising:

computing a local pseudonym key as a second hash-based message authentication code on the pseudonym seed combined with the first data controller identifier with a local pseudonym key generation key;

computing a local pseudonym based on the global pseudonym using a cryptographic mixing function based on the local pseudonym key; and providing the local pseudonym to the first data controller.

2. The pseudonymisation method according to claim 1, wherein the pseudonym seed is computed based on an encrypted data subject identifier using the cryptographic mixing function based on a pseudonym seed key, the pseudonym seed key being computed based on the pseudonym seed generation key as a cryptographic mixing function based on a random key and wherein the encrypted data subject identifier is computed based on the data subject identifier using the cryptographic mixing function based on the random key and wherein the first hash-based message authentication code is computed on the cryptographic mixing function of the encrypted data subject identifier based on the pseudonym seed key.

3. The pseudonymisation method according to claim 2, wherein the second hash-based message authentication code is computed on the cryptographic mixing function of the encrypted data subject identifier based on the pseudonym seed key.

4. The pseudonymisation method according to claim 2, wherein the steps of receiving the data subject identifier, computing the pseudonym seed, computing the global pseudonym, computing the local pseudonym key, computing the local pseudonym, and providing the local pseudonym are performed by a second entity separate from the data controller.

5. The pseudonymisation method according to claim 4, wherein generation of the random key and the pseudonym seed key is done by a third entity separate from the first data controller and the second entity.

6. The pseudonymisation method according to claim 5, wherein shared pseudonyms between the first data controller and a separate second data controller are computed as a third hash-based message authentication code on the global pseudonym combined with the cryptographic mixing function of the first data controller identifier and a second data controller identifier with a shared pseudonym key.

7. The pseudonymisation method according to claim 6, wherein for computing the third hash-based message authentication code the first data controller identifier and the second data controller identifier are encrypted.

8. The pseudonymisation method according to claim 7, wherein the third hash-based message authentication code is computed by a fourth entity separate from the first data controller, second and third entity.

9. The pseudonymisation method according to claim 6, wherein the third hash-based message authentication code is computed according to a policy defined by the first data controller.

10. The pseudonymisation method according to claim 8, wherein the encryption of the first data controller identifier and the second data controller identifier is done by a fifth entity separate from the first data controller, second, third and fourth entity.

11. The pseudonymisation method according to claim 10, wherein communication of data between said first data controller, second, third, fourth and fifth entities is signed and encrypted using asymmetric cryptography.

12. The pseudonymisation method according to claim 1, wherein different keys, the global pseudonym, the local pseudonym and the data controller identifier are bit sequences of a predetermined length and the cryptographic mixing function is an exclusive or function.

13. A computer system for performing a pseudonymisation method, the computer system comprising at least one computer programmed to:

receive a data subject identifier from a first data controller, the first data controller having a first data controller identifier;

compute a pseudonym seed based on the data subject identifier using a cryptographic mixing function based on a pseudonym seed generation key;

compute a global pseudonym as a first hash-based message authentication code on the pseudonym seed with a global pseudonym key;

compute a local pseudonym key as a second hash-based message authentication code on the pseudonym seed combined with the first data controller identifier with a local pseudonym key generation key;

compute a local pseudonym based on the global pseudonym using a cryptographic mixing function based on the local pseudonym key; and provide the local pseudonym to the first data controller.

14. The computer system according to claim 13, wherein said computer system comprises a plurality of separate computers interconnected by a computer network, each of said separate computers being programmed to perform one or more steps of the pseudonymisation method, such that the pseudonymisation method is collectively performed by the plurality of separate computers, wherein each of said separate computers is operated by a respective separate entity.

15. The computer system according to claim 14, wherein the pseudonym seed is computed based on an encrypted data subject identifier using the cryptographic mixing function based on a pseudonym seed key, the pseudonym seed key being computed based on the pseudonym seed generation key as a cryptographic mixing function based on a random key and wherein the encrypted data subject identifier is computed based on the data subject identifier using the cryptographic mixing function based on the random key and wherein the first hash-based message authentication code is computed on the cryptographic mixing function of the encrypted data subject identifier based on the pseudonym seed key.

16. The computer system according to claim 14, wherein communication of data between respective separate computers is signed and encrypted using asymmetric cryptography.

17. The computer system according to claim 15, wherein the second hash- based message authentication code is computed on the cryptographic mixing function of the encrypted data subject identifier based on the pseudonym seed key.

18. The computer system according to claim 15, wherein the steps of receiving the data subject identifier, computing the pseudonym seed, computing the global pseudonym, computing the local pseudonym key, computing the local pseudonym, and providing the local pseudonym are performed by a second computer operated by a second entity, wherein the second computer is one of the separate computers and the second entity is one of the separate entities, and wherein the second entity is separate from the first data controller.

19. The computer system according to claim 18, wherein the generation of the random key and the pseudonym seed key is performed by a third computer operated by a third entity, wherein the third computer is one of the separate computers and the third entity is one of the separate entities, and wherein the third entity is separate from the first data controller and the second entity.

20. The computer system according to claim 19, further programmed to compute shared pseudonyms between the first data controller and a separate second data controller as a third hash-based message authentication code on the global pseudonym combined with the cryptographic mixing function of the first data controller identifier and a second data controller identifier with a shared pseudonym key.

21. The computer system according to claim 20, wherein for computing the third hash-based message authentication code the first data controller identifier and the second data controller identifier are encrypted.

22. The computer system according to claim 21, wherein the third hash-based message authentication code is computed by a fourth computer operated by a fourth entity, wherein the fourth computer is one of the separate computers and the fourth entity is one of the separate entities, and wherein the fourth entity is separate from the first data controller, the second data controller, the second entity, and the third entity.

23. The computer system according to claim 22, wherein the encryption of the first data controller identifier and the second data controller identifier is performed by a fifth computer operated by a fifth entity, wherein the fifth computer is one of the separate computers and the fifth entity is one of the separate entities, and wherein the fifth entity is separate from the first data controller, the second data controller, the second entity, the third entity, and the fourth entity.

24. The computer system according to claim 22, wherein the third hash-based message authentication code is computed according to a policy defined by the first data controller, the policy allowing the first data controller to define rules for sharing data with other data controllers, including specifying which data controllers are authorized to receive shared pseudonyms.

* * * * *